UNITED STATES PATENT OFFICE.

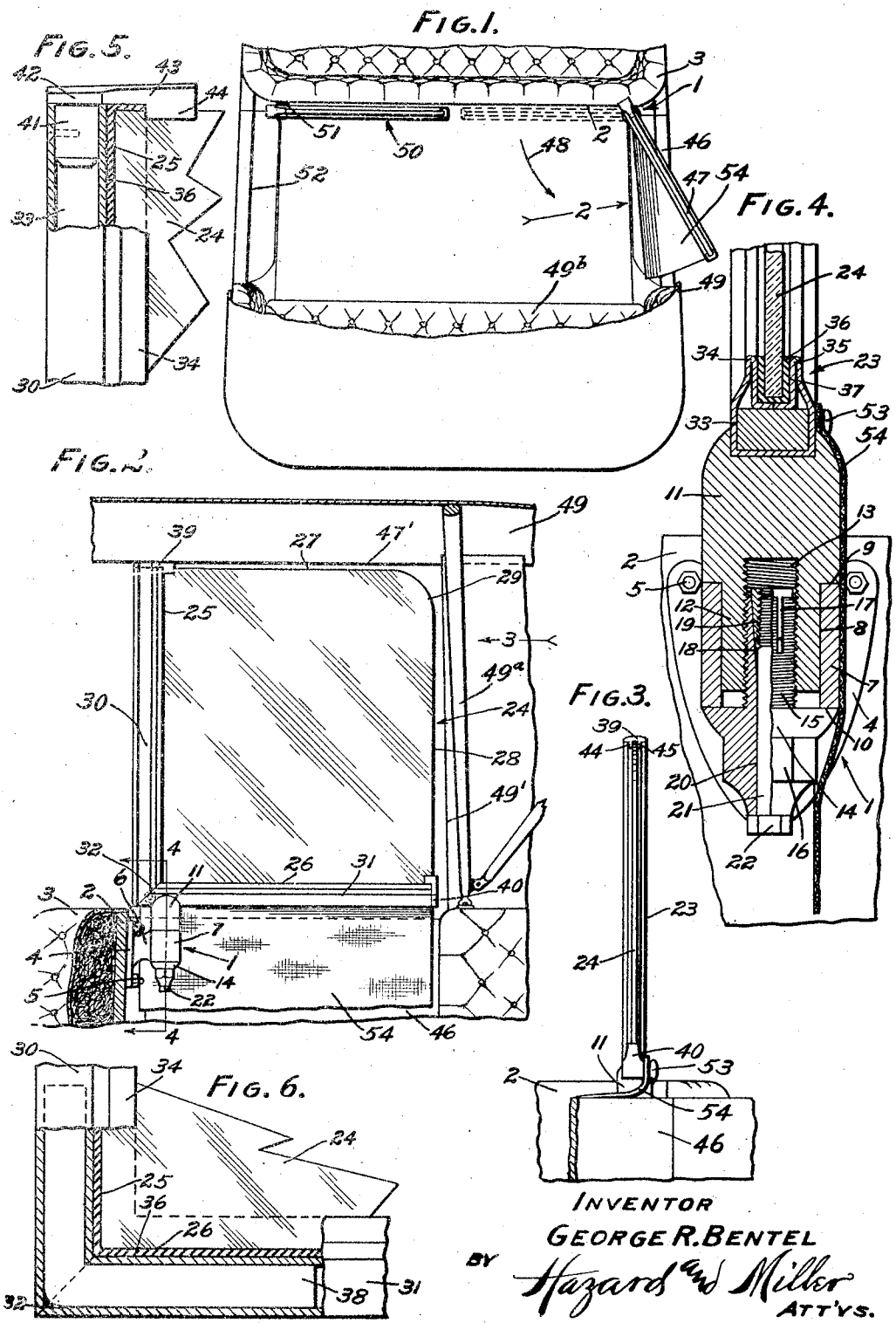

GEORGE R. BENTEL, OF LOS ANGELES, CALIFORNIA, ASSIGNOR, BY MESNE ASSIGNMENTS, TO REIM-THOMPSON CO., OF LOS ANGELES, CALIFORNIA, A CORPORATION OF CALIFORNIA.

AUXILIARY WINDSHIELD.

1,345,061.               Specification of Letters Patent.     Patented June 29, 1920.

Application filed July 31, 1918, Serial No. 247,630. Renewed March 16, 1920. Serial No. 366,434.

*To all whom it may concern:*

Be it known that I, GEORGE R. BENTEL, a citizen of the United States, residing at Los Angeles, in the county of Los Angeles and State of California, have invented new and useful Improvements in Auxiliary Windshields, of which the following is a specification.

My invention relates to auxiliary windshields and consists in the novel features herein shown, described and claimed.

Figure 1 is a fragmentary top plan of the seats of an automobile, the automobile top being broken away to show two of my auxiliary windshields in use.

Fig. 2 is a fragmentary inside elevation of the windshield in use, the parts of the automobile being broken away, the view being taken looking in the direction indicated by the arrow 2 in Fig. 1.

Fig. 3 is an edge view looking in the direction indicated by the arrow 3 in Fig. 2.

Fig. 4 is an enlarged vertical sectional detail on the line 4—4 of Fig. 2.

Fig. 5 is an enlarged fragmentary sectional detail of the frame and glass at one of the outer ends of the frame.

Fig. 6 is an enlarged fragmentary sectional detail at the corner of the frame.

The supporting bracket 1 is attached to the rear face of the frame 2 of the front seat 3.

The details of the supporting bracket 1 are as follows:

A rectangular attaching plate 4 fits against the rear face of the seat frame 2 and is secured in place by bolts or screws 5. An arm 6 extends backwardly from the center of the plate 4 and a vertical bearing 7 is supported by the arm 6, said plate 4, arm 6 and bearing 7 being preferably formed integral. The bearing 7 is cylindrical in plan, except where it joins the arm 6, and has a straight vertical bearing bore 8 and bearing faces 9 and 10 at the ends of the bore. A supporting head 11 fits upon the face 9 and a pintle 12 extends from the supporting head 11 and fits in the bearing bore 8, said pintle being slightly shorter than the bore. A screw-threaded clamping bore 13 extends upwardly from the lower end face of the pintle 12. A clamping head 14 fits against the face 10. A clamping screw 15 extends upwardly from the clamping head 14 into the clamping bore 13. A wrench seat 16 is formed upon the head 14 for manipulating the head to tighten the screw 15 in the bore 13. Transverse slots 17 are formed in the upper end of the screw 15. A tapered seat 18 extends downwardly into the upper end of the clamping screw 15. A tapered expanding plug 19 fits in the seat 18. A plug screw bore 20 extends downwardly from the seat 18 through the head 14. A plug screw 21 is inserted upwardly through the bore 20 and screw-seated in the plug 19, the head 22 of the screw fitting against the lower end of the head 14, so that by applying a wrench to the wrench seat 16 and manipulating the head 14 the screw 15 may be tightened in the bore 13 to draw the supporting head 11 and the clamping head 14 tightly against the faces 9 and 10 and then by applying a wrench to the head 22 the screw 21 may be manipulated to pull the plug 19 downwardly into the seat 18 and expand the upper end of the screw 15 to tighten the screw in the bore 13 and hold the parts from shaking.

The details of the windshield frame 23 and glass 24 are as follows:

The glass 24 has two right-angled straight sides 25 and 26, two straight sides 27 and 28, and a round corner 29. The frame bars 30 and 31 are mitered and fitted together on the line 32 to make a right-angled frame. The frame bars 30 and 31 are substantially alike and are tubular channels having rectangular chambers 33 and channel flanges 34 and 35. The glass 24 is a heavy plate. A heavy fabric or rubber lining 36 is wrapped around the edge of the plate and then the plate and lining is pressed tightly into the channel 37 between the flanges 34 and 35.

In preparing the frame 23, a solid right-angled bar 38 is driven into the mitered ends of the frame bars 30 and 31 and then the mitered faces are brazed together so as to form a very rigid corner.

After the glass has been placed in the frame the end fittings 39 and 40 are applied.

The fitting 39 comprises a solid plug 41 driven into the end of the chamber 33, a head 42 upon the plug 41 and fitting against the end of the frame bar, an arm 43 extending from the head 42 along the edge of the glass, and flanges 44 and 45 extending from the sides of the arm 43 and embracing the edge of the glass. The fabric or rubber lining 36 may extend between the arm 43 and the edge of the glass.

The fitting 40 is identical in construction with the fitting 39, and the fittings 39 and 40 are driven tightly into place and hold the glass 24 substantially as firmly as though the glass were in a four-sided frame.

Before the glass is applied to the frame the supporting head 11 is brazed to the bar 31 near the corner, and this brazing operation may be done at the same time that the corner is brazed.

In locating the supporting bracket 1 it should be attached as near as possible to the outer end of the front seat frame 2 and as low as the windshield 47 will swing over the side door 46, if there is a side door, and of course the windshield must swing under the lower edge 47' of the automobile top 49, past the edge 49' of the side curtain, and past the bow 49ª, and outwardly, as indicated by the arrow 48 in Fig. 1. In this position the windshield 47 forms a shed to direct the wind outwardly and backwardly past the occupants of the rear seat 49ᵇ.

In a like manner the windshield 50 is mounted upon the supporting bracket 51 at the opposite end of the front seat frame 2 to swing over the door 52, if there is a door, and to swing outwardly past the side curtain of the automobile top and past the bow 49ª.

If there are no side doors 46 and 52 the windshields 47 and 50 will swing in the upper parts of the door openings. A row of fasteners 53 is secured to the outer face of the frame bar 31 and a curtain 54 is secured to these fasteners and hangs downwardly to close the door opening, if there is no door, and to drag over the door and close the bottom of the opening between the door and the windshield. The fasteners 53 may be any of the well-known forms of button or snap fasteners.

Instead of the round corner 29 on the glass 24 the glass may be square-cornered or cut diagonal or in any suitable shape.

Various changes may be made in the details of construction without departing from the spirit of my invention as claimed.

I claim:

In an auxiliary windshield, a supporting bracket having a bearing provided with a vertical bore, a supporting head resting upon the bearing and having a pintle extending into the bore, a clamping head fitting against the lower side of the bearing, a clamping screw extending from the clamping head and screw-seated in the pintle; the inner end of the screw being transversely slotted and there being a seat and bore extending through the screw; a tapered expanding plug fitting in the seat point downwardly, and a screw inserted upwardly through the bore and screw-seated in the plug and having a head engaging the lower side of the clamping head and adapted to pull the plug downwardly to expand the clamping screw; and an auxiliary windshield frame rigidly secured to the supporting head.

In testimony whereof I have signed my name to this specification.

GEORGE R. BENTEL.